(12) United States Patent
Rane et al.

(10) Patent No.: US 7,690,564 B2
(45) Date of Patent: Apr. 6, 2010

(54) AUTOMATIC CLASSIFICATION OF CREDIT CARD CUSTOMERS

(75) Inventors: Rajendra R. Rane, Woodbridge, NJ (US); David Juang, Forest Hills, NY (US); Eduardo J. Alvarez, West Windsor, NJ (US); Iwao Fusillo, Merrick, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 967 days.

(21) Appl. No.: 11/451,542

(22) Filed: Jun. 13, 2006

(65) Prior Publication Data

US 2007/0288299 A1 Dec. 13, 2007

(51) Int. Cl.
*G06K 5/00* (2006.01)

(52) U.S. Cl. .................. 235/380; 235/375; 705/10; 705/26

(58) Field of Classification Search .................. 235/375, 235/380, 381; 705/1, 10, 26, 30, 35, 38
See application file for complete search history.

(56) References Cited

U.S. PATENT DOCUMENTS

| | | | | |
|---|---|---|---|---|
| 5,774,868 A | * | 6/1998 | Cragun et al. .................. | 705/10 |
| 6,353,811 B1 | * | 3/2002 | Weissman ..................... | 705/40 |
| 6,850,896 B1 | * | 2/2005 | Kelman et al. ................ | 705/10 |
| 2003/0061132 A1 | * | 3/2003 | Yu et al. ....................... | 705/30 |
| 2004/0088185 A1 | * | 5/2004 | Watarai et al. ................. | 705/1 |
| 2004/0138958 A1 | * | 7/2004 | Watarai et al. ................ | 705/26 |
| 2005/0021401 A1 | * | 1/2005 | Postrel ......................... | 705/14 |
| 2006/0143071 A1 | * | 6/2006 | Hofmann ...................... | 705/10 |

OTHER PUBLICATIONS

Reategui et al., A Classification System for Credit Card Transactions, Advances in Case-Based Reasoning, Second European Workshop (Nov. 7-10, 1994), p. 280-291.*

Thomas, L., "A Survey of Credit and Behavioural Scoring: Forecasting financial risk of lending to consumers", International Journal of Forecasting, vol. 16, Issue 3, May 31, 2000, p. 140-172.*

* cited by examiner

*Primary Examiner*—Steven S Paik
*Assistant Examiner*—William M Anderson, Jr.
(74) *Attorney, Agent, or Firm*—Snell & Wilmer L.L.P.

(57) ABSTRACT

According to embodiments of the present invention there is provided a computer-based method and a computer program product for automatically sorting customers who make purchases from merchants using a credit card. The computer-based method includes the following steps. An adjusted index is calculated for a customer based on an amount of money the customer spent across merchants during a time period. The adjusted index is compared to a cut-off value. The customer is classified based on the comparison of the adjusted index to the cut-off value. In an embodiment, the method also includes re-classifying the customer based on at least one of (i) information about the merchants, or (ii) a number of transactions in a predetermined industry.

20 Claims, 3 Drawing Sheets

AUTOMATIC CLASSIFICATION OF CREDIT CARD CUSTOMERS

BACKGROUND OF THE INVENTION

1. Field of the Invention

The present invention generally relates to automatic classification systems, and more particularly to automatic classification of customers.

2. Related Art

Many credit card issuers provide different types of credit cards. Each different type of credit card may include offers and incentives which are designed to meet the needs of specific types of customers. For example, a first credit card may offer cash back on consumer purchases, such as gasoline and groceries. This first credit card may be designed to meet the needs of consumers in that a consumer could benefit from cash back on consumer purchases. As another example, a second credit card may offer airline miles for each credit card transaction, and may allow the credit card holder to authorize multiple users. This second credit card may be designed to meet the needs of small business owners in that a small business owner could use the airline miles for business travel, and the small business owner could authorize her employees to use the credit card.

A credit card issuer that offers credit cards directed to specific types of customers could more effectively meet the needs of its customers if it could determine whether a customer is a consumer or a business user. Although a customer may be a small business owner, she may not be aware of the advantages available to her by having a credit card that is designed to meet the needs of a small business owner. If the credit card issuer could determine that this customer was a small business owner, then the credit card issuer could present targeted marketing advertisements to this customer illustrating the comparative advantages of having a credit card designed to meet the needs of small business owners, for example.

A typical method for classifying customers is to perform a manual inspection of all records of charges by the customers. Such a manual inspection method is time consuming, subjective, and error prone. A credit card issuer may have a large number of customers (e.g., hundreds of thousands of customers, millions of customers, or some other large number of customers). Classifying such a large number of customers manually would be prohibitively time consuming, and would lead to different classifications of customers depending on who performed the manual inspection.

Given the foregoing, what is needed is a method and computer program product for automatically identifying and classifying customers. Such a method and computer program product should allow a credit card issuer to provide improved services, incentives, offers, and rewards to a customer based on whether the customer is a consumer or a business user. In addition, such a method and computer program product should allow the credit card issuer to assess the comparative risk associated with extending credit to a customer based on whether the customer is a consumer or a business user.

BRIEF DESCRIPTION OF THE INVENTION

The present invention meets the above-identified needs by providing a method and computer program product for automatically identifying and classifying customers.

According to an embodiment of the present invention there is provided a computer-based method for automatically sorting customers who make purchases from merchants using a credit card. The computer-based method includes the following steps. An adjusted index is calculated for a customer based on an amount of money the customer spent across merchants during a time period. The adjusted index is compared to a cut-off value. The customer is classified based on the comparison of the adjusted index to the cut-off value. In an example, the method also includes re-classifying the customer based on at least one of (i) information about the merchants, or (ii) a number of transactions in a predetermined industry.

According to another embodiment of the present invention there is provided a computer program product for automatically sorting customers who make purchases from merchants using a credit card. The computer program product includes a computer usable medium having control logic stored therein for causing a computer to automatically sort the customers. The control logic includes first, second, and third computer readable code. The first computer readable program code causes the computer to calculate an adjusted index for a customer based on an amount of money the customer spent across merchants during a time period. The second computer readable program code causes the computer to compare the adjusted index to a cut-off value. The third computer readable program code causes the computer to classify the customer based on the comparison of the adjusted index to the cut-off value. In an example, the control logic also includes fourth computer readable code that causes the computer to re-classify the customer based on at least one of (i) information about the merchants, or (ii) a number of transactions in a predetermined industry.

An advantage of the present invention is that it allows a credit card issuer to provide improved services, incentives, offers, and rewards to a customer based on whether the customer is a consumer or a business user. These improvements will have a positive effect on the customer's loyalty to the credit card issuer, and will increase the customer's use of the credit card.

Another advantage of the present invention is that it allows a credit card issuer to experience higher returns on marketing dollars because offers and promotions can be more precisely targeted to a customer based on whether the customer is a consumer or a business user.

A further advantage of the present invention is that it allows a credit card issuer to better assess the risk associated with extending credit to a customer. Business owners tend to be higher risk takers than non-business owners. As a result, a credit card issuer assumes a higher risk by extending credit to a business owner compared to extending credit to a consumer. Using an embodiment of the present invention, a credit card issuer can automatically sort customers as consumers or business users. Accordingly, the credit card issuer can determine the risk associated with extending credit to a customer based on whether that customer is a consumer or a business user.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION

I. Overview

The present invention is directed to a method and computer program product for automatically sorting customers based on spend and demographic variables.

The term "customer" and/or the plural form of this term shall mean any person, entity, or the like that makes purchases using a credit card, and therefore may be automatically sorted and classified in accordance with an embodiment of the present invention. As used herein, a "customer" may be broadly categorized as a "business user" (a customer who uses the credit card to make primarily business-related purchases) or a "consumer" (a customer who uses the credit card to make primarily consumer-related purchases).

The terms "merchant" or "seller" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The present invention is now described in more detail herein in terms of an example closed-loop system, such as the system used by American Express®. During a credit card transaction in a closed-looped system, the issuer of the credit card receives information about the customer and the merchant involved because the issuer authorizes and handles all aspects of each credit card transaction. The issuer may then use this information to categorize customers. The description of the present invention in terms of a closed-loop network, however, is for convenience only and is not intended to limit the application of the present invention. In fact, after reading the following description, it will be apparent to one skilled in the relevant art(s) how to implement the following invention in alternative embodiments (e.g., an open-loop system or any system in which an issuer receives information about a customer and merchant after a credit card transaction).

II. System

Figure 1:
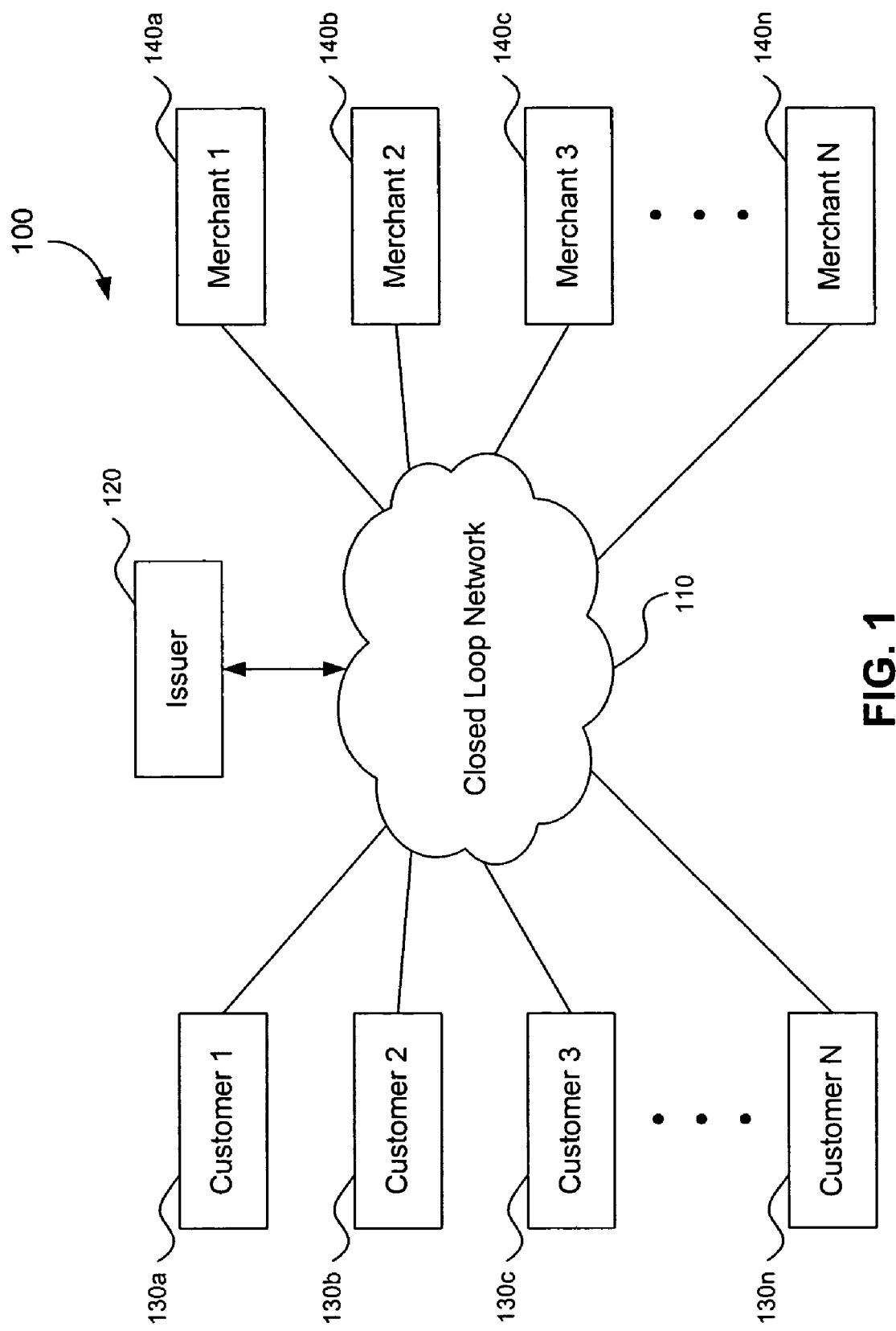
FIG. 1 is a system diagram of an exemplary closed-loop network in which the present invention, in an embodiment, would be implemented.

FIG. 1 depicts a system diagram of an exemplary closed-loop system 100 in which an embodiment of the present invention may be implemented. Closed-loop system 100 includes a closed-loop network 110, which connects an issuer 120 to a plurality of customers 130a-n and a plurality of merchants 140a-n. As alluded to above, the issuer 120 authorizes and handles all aspects of a credit card transaction between a customer (such as customer 130a) and a merchant (such as merchant 140a) in closed-loop system 100. This point will be illustrated by describing the information flow that occurs when customer 130a makes a purchase from merchant 140a using a credit card.

In a typical closed-loop credit card transaction, the merchant 140a swipes the credit card of customer 130a. After the credit card is swiped, the issuer 120 receives via closed-loop network 110 (i) details about the customer 130a, (ii) details about the merchant 140a, and (iii) the amount of the transaction. The issuer 120 then sends a message back to the merchant 140a either authorizing or denying the transaction. If the transaction is authorized, the customer 130a signs a voucher slip. The merchant 140a then checks the signature on the back of the credit card against the signature on the voucher slip, and the transaction is completed.

In system 100, the issuer 120 automatically receives details about the customer, details about the seller, and the amount of a transaction. As described in the next section, this information can be used in accordance with an embodiment of the present invention to categorize customers as either consumers or merchants. In this way, the issuer 120 can provide better service and make better offers to the customer. In addition, the issuer 120 can better assess the risk associated with issuing credit to a particular customer depending on whether the customer is classified as a consumer or a merchant.

III. Process

Figure 2:
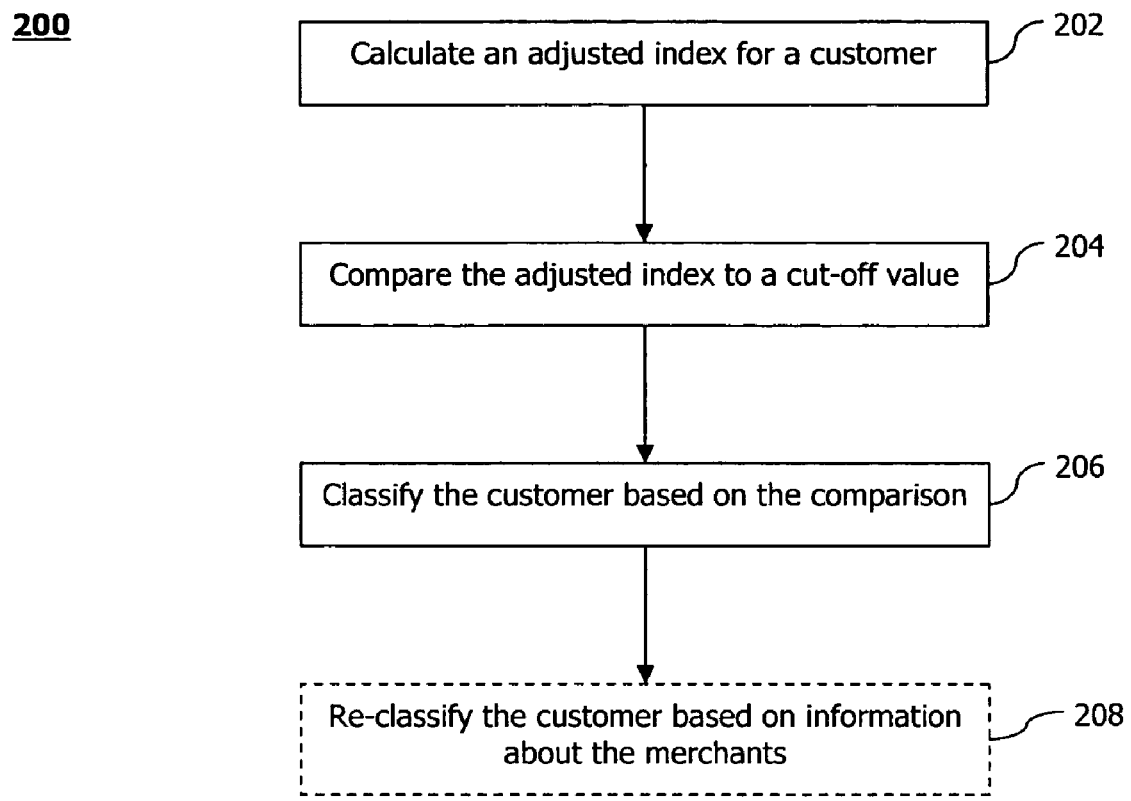
FIG. 2 is a flowchart illustrating a computer-based method for automatically sorting customers who make purchases from merchants using a credit card in accordance with an embodiment of the present invention.

FIG. 2 depicts a flowchart illustrating a process 200 for automatically sorting credit card customers in accordance with an embodiment of the present invention. For example, the issuer 120 (of FIG. 1) can use process 200 to sort customers 130a-130n based on information received during credit card transactions between customers and merchants. Information that is used to sort the customers can include, but is not limited to, the aggregated dollar amount each customer spent at each merchant, the merchants' names, the number of transactions completed by each customer, the industry to which each merchant belongs (such as retail, travel, business services, lodging, entertainment, etc.), and similar types of information. This information is collected over a time period (such as a week, a month, a year, several years, or some other time period).

Process 200 begins at a step 202 in which an adjusted index is calculated for a customer based on an amount of money the customer spends across merchants during a time period. The adjusted index is a quantitative measure that is used to distinguish different groups of customers based on the amount of money each customer spends. For example, the adjusted index indicates whether a customer spends most of her money at a few merchants or whether she spends her money relatively evenly at a number of different merchants. The adjusted index may be based on the aggregate amount of money the customer spent at all merchants during the time period and/or an individual amount of money the customer spent at each merchant during the time period. An example adjusted index that captures these qualitative notions is as follows:

$$\frac{1}{M}\sum_{i=1}^{n}(m_i)^2, \quad (1)$$

wherein M is the aggregate amount of money the customer spends at all merchants during the time period, $m_i$ is the individual amount of money the customer spends at an individual merchant i during the time period, and n is the total number of merchants at which the customer spends money during the time period.

In a step 204, the adjusted index is compared to a cut-off value. The cut-off value maybe determined, for example, from a manual categorization of the customers. In this example, each customer in a training group is manually categorized as a "consumer" or a "business user" based on a conventional categorization scheme, as would be apparent to a person skilled in the relevant art(s). The adjusted index is then calculated for each customer in the training group. The cut-off value may be chosen so that it is below the adjusted indexes of a percentage of the customers in the "business user" category, and above the adjusted indexes of a percentage of the customers in the "consumer" category.

In a step 206, the customer is classified as a "consumer" or a "business user" based on a comparison of the adjusted index to the cut-off value. The customer may be automatically classified according to the following example scheme: (i) if the adjusted index is greater than the cut-off value, the customer is classified as a "business user"; and (ii) if the adjusted index is less than the cut-off value, the customer is classified as a "consumer." Using this classification scheme, a predetermined percentage of customers will be sorted into the same category as they would be had the manual categorization scheme been used. In other words, a predetermined percentage of customers can be "correctly" categorized by simply comparing each customer's adjusted index to the cut-off value. In an embodiment, the cut-off value is chosen to be 0.3, and 72% of customers are correctly categorized as "consumers" or "business users" based on a comparison of each customer's adjusted index to the cut-off value.

Process 200 may also optionally include a step 208 in which the customer is re-classified based on information about merchants at which the customer spent money. Merchants at which a customer spent money are ranked according to an amount of money the customer spent at each merchant. Merchants at which the customer spent the most amount of money are denoted as top-merchants. Then, the customer can be re-classified based on the industry of the customer's top-merchants. If a percentage of a customer's top-merchants (such as four of the top five) are from the business services industry, then the customer can be re-classified as a "business user," even if this customer's adjusted index is below the cut-off value. Conversely, if a percentage of the customer's top-merchants are from a non-business industry, then the customer can be re-classified as a "consumer," even if this customer's adjusted index is above the cut-off value.

As another example of a re-classification scheme that can be implemented in step 208, a customer can be re-classified based on a keyword search of the names of the customer's top-merchants. If the names of a percentage of a customer's top-merchants include business related words and/or word stems (such as "consult," "consultants," "print," "printing," "staffing," or the like), then the customer can be re-classified as a "business user," even if this customer's adjusted index is below the cut-off value. Conversely, if the names of a percentage of a customer's top-merchants include non-business related words and/or word stems (such as "cruise," "cruises," "diamond," or the like), then the customer can be re-classified as a "consumer," even if this customer's adjusted index is above the cut-off value. In an embodiment, a keyword search for business related words and/or word stems is performed only for customers that were classified as "consumers" in step 206; and, a keyword search for non-business related words and/or word stems is performed only for customers that were classified as "business users" in step 206.

As a further example of a re-classification scheme that can be implemented in step 208, a customer can be re-classified based on a particular type of transaction that occurred during the time period. A customer with a large number of business related transactions (such as airline transactions, car rentals, or the like) can be re-classified as a "business user," even if previous rules classified this customer as a "consumer." To determine whether a large number of business related transactions has occurred, the number of business related transactions can be compared to a threshold value. For example, if the number of business related transactions made by a customer during the time period exceeds a threshold value (such as 100 transactions), then the customer can be re-classified as a business user.

By implementing both the classification scheme of step 206 and the re-classification schemes of step 208, approximately 90% of customers can be "correctly" sorted as consumers or business users.

IV. Example Implementations

The present invention (e.g., system 100, process 200 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
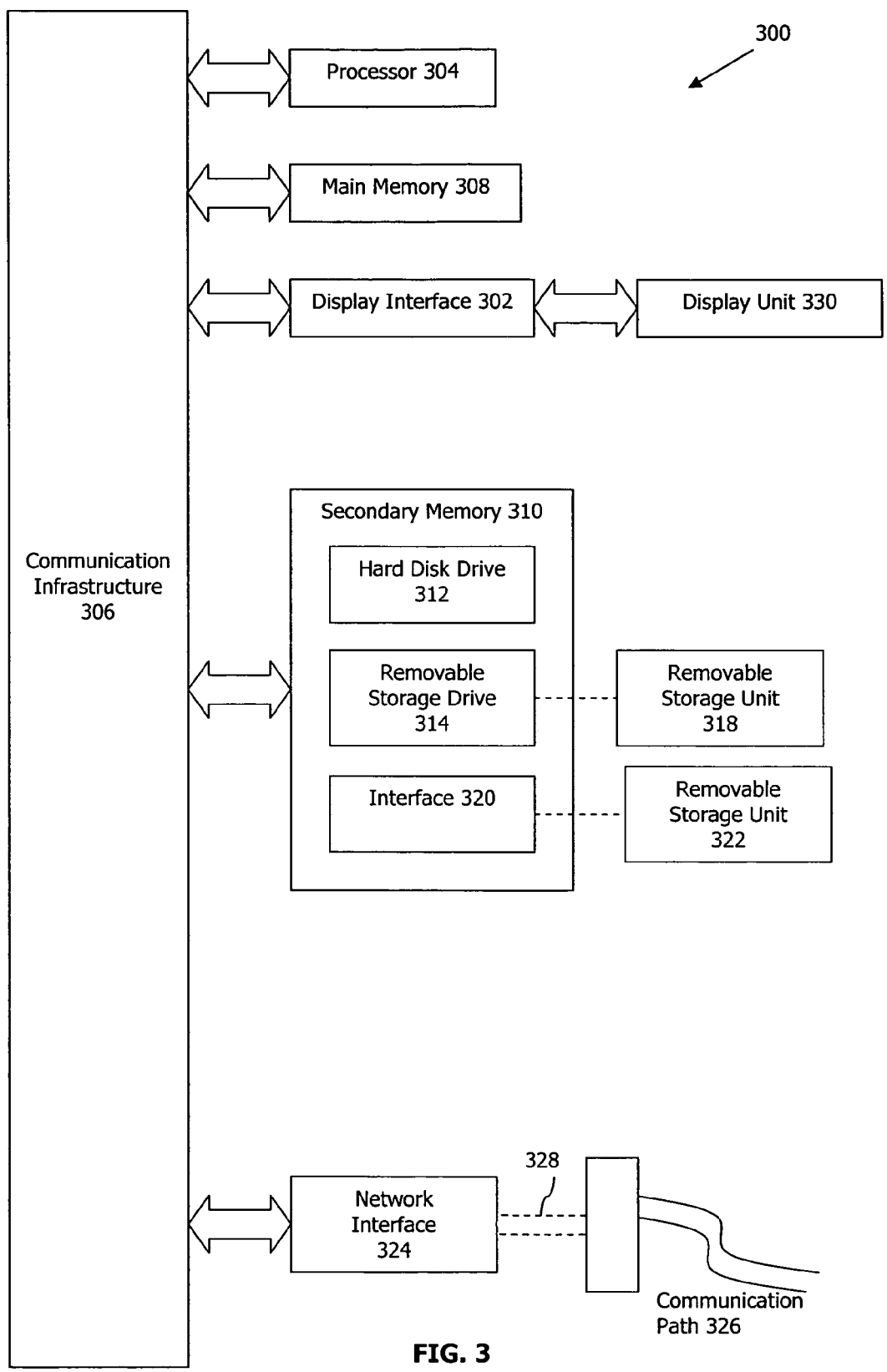
FIG. 3 is a block diagram of an exemplary computer system useful for implementing the present invention.

In fact, in one embodiment, the invention is directed toward one or more computer systems capable of carrying out the functionality described herein. An example of a computer system 300 is shown in FIG. 3.

The computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM))

and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 314, a hard disk installed in hard disk drive 312, and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-based method for automatically sorting customers who make purchases from merchants using a credit card, comprising:

calculating an adjusted index for a customer based on an amount of money the customer spent across merchants during a time period, wherein the adjusted index is given by $$\frac{1}{M}\sum_{i=1}^{n}(m_i)^2,$$

wherein:
   M is the aggregate amount of money the customer spent at all merchants during the time period,
   $m_i$ is the individual amount of money the customer spent at individual merchant i during the time period, and
   n is a total number of merchants at which the customer spent money during the time period;

comparing the adjusted index to a cut-off value; and classifying the customer based on the comparison of the adjusted index to the cut-off value.

2. The method of claim 1, further comprising:
re-classifying the customer based on at least one of (i) information about the merchants, or (ii) a number of transactions in a predetermined industry.

3. The method of claim 1, wherein the calculating comprises:
calculating an adjusted index for the customer based on (i) an aggregate amount of money the customer spent at all merchants during the time period, and (ii) an individual amount of money the customer spent at each merchant during the time period.

4. The method of claim 1, wherein the comparing comprises determining the cut-off value based on a manual classification of a training data set.

5. The method of claim 1, wherein the classifying comprises:
assigning the customer to one of (i) the first category in response to the adjusted index being greater than the cut-off value, or (ii) the second category in response to the adjusted index being less than the cut-off value.

6. The method of claim 5, further comprising:
ranking the merchants at which the customer spent money based on an individual amount of money the customer spent at each merchant, the N highest ranked merchants being designated as top-ranked merchants, wherein N is a positive integer.

7. The method of claim 5, further comprising:
switching the customer between the first category and the second category based on at least one of a keyword search of names of merchants at which the customer spent money or based on an industry of the top-ranked merchants.

8. The method of claim 5, further comprising:
switching the customer from the second category to the first category in response to a number of business transactions exceeding a threshold.

9. The method of claim 1, wherein the cut-off value is indicative of a first category of credit card users likely to be business users and a second category of credit card users likely to be consumers.

10. The method of claim 1, wherein the classifying the customer comprises classifying the customer as one of a consumer or a business user based on the comparison of the adjusted index to the cut-off value.

11. A computer program product comprising a computer usable medium having control logic stored therein for causing a computer to automatically sort customers who make purchases from merchants using a credit card, said control logic comprising:
first computer readable program code that causes the computer to calculate an adjusted index for a customer based on an amount of money the customer spent across merchants during a time period, wherein the adjusted index is calculated as:

$$\frac{1}{M}\sum_{i=1}^{n}(m_i)^2,$$

wherein:
M is the aggregate amount of money the customer spent at all merchants during the time period,
$m_i$ is the individual amount of money the customer spent at individual merchant i during the time period, and
n is a total number of merchants at which the customer spent money during the time period;
second computer readable program code that causes the computer to compare the adjusted index to a cut-off value;
and
third computer readable program code that causes the computer to classify the customer based on the comparison of the adjusted index to the cut-off value.

12. The computer program product of claim 11, further comprising:
fourth computer readable program code that causes the computer to re-classify the customer based on at least one of (i) information about the merchants, or (ii) a number of transactions in a predetermined industry.

13. The computer program product of claim 11, wherein the first computer readable program code comprises:
code that causes the computer to calculate an adjusted index for the customer based on (i) an aggregate amount of money the customer spent at all merchants during the time period, and (ii) an individual amount of money the customer spent at each merchant during the time period.

14. The computer program product of claim 11, wherein the second computer readable program code comprises:
code that causes the computer to determine the cut-off value based on a manual classification of a training data set.

15. The computer program product of claim 11, wherein the third computer readable program code comprises:
code that causes the computer to assign the customer to one of (i) the first category when the adjusted index is greater than the cut-off value, or (ii) the second category when the adjusted index is less than the cut-off value.

16. The computer program product of claim 15, further comprising:
fourth computer readable program code that causes the computer to rank the merchants at which the customer spent money based on an individual amount of money the customer spent at each merchant, the N highest ranked merchants being designated as top-ranked merchants, wherein N is a positive integer.

17. The computer program product of claim 15, further comprising:
fourth computer readable program code that causes the computer to switch the customer between the first category and the second category based on at least one of a keyword search of names of merchants at which the customer spent money or an industry of the top ranked merchants.

18. The computer program product of claim 15, further comprising:
fourth computer readable program code that causes the computer to switch the customer from the second category to the first category in response to a number of business transactions exceeding a threshold.

19. The computer program product of claim 11, wherein the cut-off value is established based on the credit card spending of a plurality of users of the credit card and is indicative of a first category of credit card users likely to be business users and a second category of credit card users likely to be consumers.

20. The computer program product of claim 11, wherein the customer is classified as one of a consumer or a business user based on the comparison of the adjusted index to the cut-off value.

* * * * *